(12) United States Patent
Tokizawa et al.

(10) Patent No.: US 6,971,153 B2
(45) Date of Patent: Dec. 6, 2005

(54) METHOD OF MANUFACTURING WINDING OF ROTARY ELECTRIC MACHINE

(75) Inventors: Takashi Tokizawa, Nisshin (JP); Mitsuru Kato, Anjo (JP); Yoshinori Nakamura, Okazaki (JP); Yasunori Kitakado, Okazaki (JP); Motohiro Murahashi, Anjo (JP)

(73) Assignee: Denso Corporation, Kariya (JP)

( * ) Notice: Subject to any disclaimer, the term of this patent is extended or adjusted under 35 U.S.C. 154(b) by 239 days.

(21) Appl. No.: 10/372,782

(22) Filed: Feb. 26, 2003

(65) Prior Publication Data

US 2003/0163912 A1 Sep. 4, 2003

(30) Foreign Application Priority Data

Mar. 1, 2002 (JP) .............................. 2002-055781
Jan. 21, 2003 (JP) .............................. 2003-011912

(51) Int. Cl.[7] ...................... H02K 15/00; H02K 15/14; H02K 15/16

(52) U.S. Cl. ............................ 29/596; 29/606; 29/733; 29/735; 29/844; 310/184; 310/201; 310/206; 310/270

(58) Field of Search .................. 29/596, 606, 733, 29/735, 844; 310/184, 201, 208, 270

(56) References Cited

U.S. PATENT DOCUMENTS

| 5,619,088 | A | | 4/1997 | Yumiyama et al. | |
|---|---|---|---|---|---|
| 5,936,326 | A | * | 8/1999 | Umeda et al. | 310/179 |
| 6,388,358 | B1 | | 5/2002 | Umeda et al. | |
| 6,476,530 | B1 | | 11/2002 | Nakamura et al. | |
| 6,501,206 | B2 | * | 12/2002 | Oohashi et al. | 310/184 |
| 6,707,211 | B2 | * | 3/2004 | Oohashi et al. | 310/179 |
| 6,710,496 | B2 | * | 3/2004 | Fujita et al. | 310/201 |
| 2002/0053126 | A1 | | 5/2002 | Maeda et al. | |
| 2003/0015932 | A1 | | 1/2003 | Oohashi et al. | |

FOREIGN PATENT DOCUMENTS

| EP | 1128530 A2 * | 8/2001 | .......... H02K 15/04 |
|---|---|---|---|
| JP | A 2000-299949 | 10/2000 | |
| JP | A 2001-238385 | 8/2001 | |
| JP | A 2002-64028 | 2/2002 | |

* cited by examiner

*Primary Examiner*—A. Dexter Tugbang
*Assistant Examiner*—Tim Phan
(74) *Attorney, Agent, or Firm*—Oliff & Berridge, PLC

(57) ABSTRACT

A method of manufacturing a winding of a rotary electric machine includes steps of pressing a portion of a conductor segment in a predetermined direction to reduce its dimension in the direction, inserting the conductor segment into a slot of a stator core, bending the conductor segments and joining ends of the conductor segments. In the pressing step, the conductor segment is pressed with a punch in a condition that it is held in a die that has curved inside corner portions to restrict deformation of corners of the pressed portion.

5 Claims, 9 Drawing Sheets

METHOD OF MANUFACTURING WINDING OF ROTARY ELECTRIC MACHINE

CROSS REFERENCE TO RELATED APPLICATION

This application is based on Japanese Patent Applications No. 2002-55781 filed on Mar. 1, 2002 and No. 2003-11912 filed on Jan. 21, 2003, the disclosure of which are incorporated herein by reference.

FIELD OF THE INVENTION

The present invention relates to a method of manufacturing a winding of a rotary electric machine, such as a vehicular alternator mounted on passenger vehicles or trucks and a method of forming a dent on the winding.

BACKGROUND OF THE INVENTION

In recent years, an improvement of a power generation performance is more required in a vehicular alternator, in accordance with an increase in current consumer by safety control apparatus. In a vehicular alternator disclosed in JP-A-2000-166148, for example, U-shaped electric conductors are regularly arranged in slots of a stator core. Occupancy of electric conductors in the slots is increased, thereby improving power output.

In this alternator, gaps are defined between electric conductors at portions where the electric conductors are adjacent in a radial direction at an axial end of the stator core to maintain electrical insulation therebetween. The gaps are formed by denting the electric conductor partially.

For example, a dent is formed on an electric conductor in a manner shown in FIG. 12A. An electric conductor 210 is pressed with a punch 202 in one direction in a die 200 so that its dimension along a pressing direction is reduced. However, when the electric conductor is pressed in one direction, the edges of the electric conductor, which are adjacent to inside corners of the die 200 are likely to deform, especially in a direction perpendicular to the pressing direction, as shown in FIG. 12B.

Generally, slots are formed on a stator core by press working, and corners of the slots are curved. Therefore, when the electric conductor, the edges of which are deformed, is inserted in the slot, the electric conductor may breaks an insulator provided in the slot at the corners. Accordingly, it is difficult to maintain electrical insulation between the stator core and the electric conductors.

SUMMARY OF THE INVENTION

The present invention is made in view of the above disadvantage and it is an object of the present invention to provide a method of manufacturing a winding of a rotary electric machine capable of maintaining electrical insulation between a stator core and electric conductors and a method of forming a dent on the winding.

According to the present invention, a method of manufacturing a winding includes a step of pressing a portion of an electric conductor with a punch in a predetermined direction in a condition that the electric conductor is held on a die, thereby reducing a dimension of the portion in the predetermined direction. The die has a predetermined shape for restricting deformation of a corner of the electric conductor.

Therefore, it is less likely that the corner of the pressed portion will irregularly deform by pressing. Accordingly, when the electric conductor is inserted in a slot of a stator core, it is less likely to damage an insulator provided in the slot. Thus, electrical insulation between the stator core and the electric conductor is maintained.

Exemplary, the die has a corner portion having a radius R1 of curvature that is smaller than a radius R0 of curvature of the corner of the electric conductor. When the electric conductor is pressed, the corner of the pressed portion is formed in the shape of the corner portion of the die.

Because deformation of the corner of the electric conductor is restricted by the corner portion of the die, it is less likely that an insulating film applied on the electric conductor will break when the electric conductor is partially dented.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to drawings.

Figure 1:
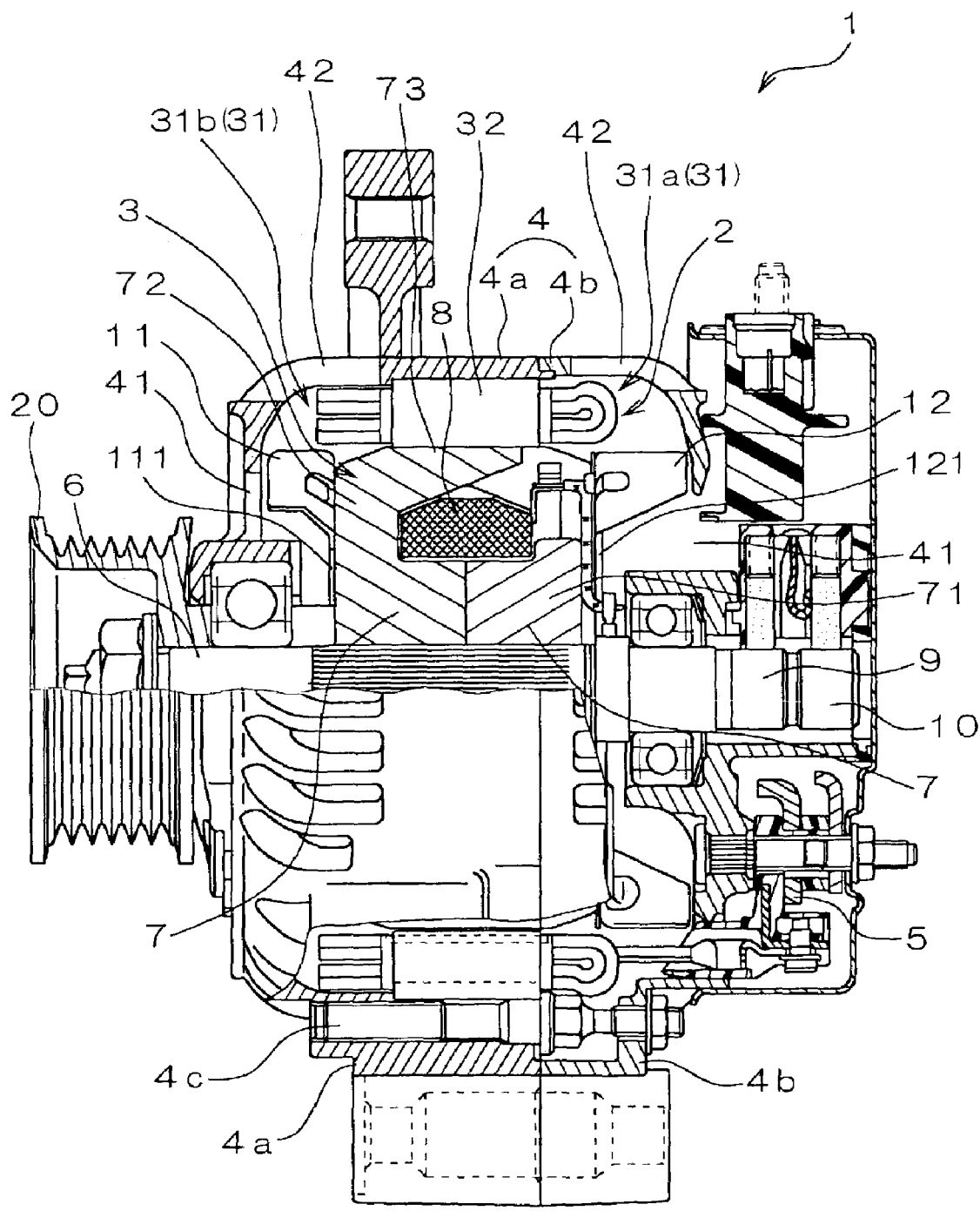
FIG. 1 is a schematic view of a vehicular alternator, partially includes cross-section, according to an embodiment of the present invention.

As shown in FIG. 1, a vehicular alternator 1 of the embodiment includes a stator 2, a rotor 3, a housing 4, a rectifier 5 and the like.

The rotor 3, which functions as a field magnet, rotates with a shaft 6, and includes a Lundell-type pole core 7, a field coil 8, slip rings 9, 10, a mixed flow fan 11, and a centrifugal fan 12 as an air blowing device. The shaft 6 is connected to a pulley 20, and rotated by an onboard engine (not shown) for driving a vehicle.

The Lundell-type pole core 7 is constructed of a pair of pole cores. The Lundell-type pole core 7 includes a boss portion 71, which is fixed to the shaft 6, disc portions 72, which extend from the ends of the boss portion 71 in the radial direction, and twelve claw poles 73.

The mixed flow fan 11 adjacent to the pulley 20 includes blades that are arranged at acute angles and blades that are arranged at right angles to a base plate 111, which is fixed to an end surface of the pole core 7 such as by welding. The centrifugal fan 12 on a side opposite to the pulley 20 only includes blades that are arranged at right angles to a base plate 121, which is fixed to an end surface of the pole core 7 such as by welding. The mixed flow fan 11 and the centrifugal fan 12 rotate with the rotor 3.

The housing 4 includes a front housing 4a and a rear housing 4b. The housing 4 forms air inlet holes 41 on its axial end surfaces. Also, the housing 4 forms cooling air outlet holes 42 on its shoulder portions corresponding to the radially outer peripheries of a first coil ends 31a and a second coil ends 31b of the stator 2. The front housing 4a and the rear housing 4b are fastened together with bolts 4c in a condition that the stator 2 and the rotor 3 are held therebetween.

The rectifier 5 rectifies an AC voltage outputted from the stator 2 to a DC voltage. The rectifier 5 is fixed to the end on the side opposite to the pulley in the vehicular alternator 1.

The stator 2 functions as an armature, and includes a stator winding 31, the stator core 32, and insulators 34. The stator winding 31 is constructed of the conductor segments 33 as a plurality of electric conductors that are arranged in slots 35 of the stator core 35. The insulators 34 provide electrical insulation between the stator core 32 and the stator winding 31.

Figure 2:
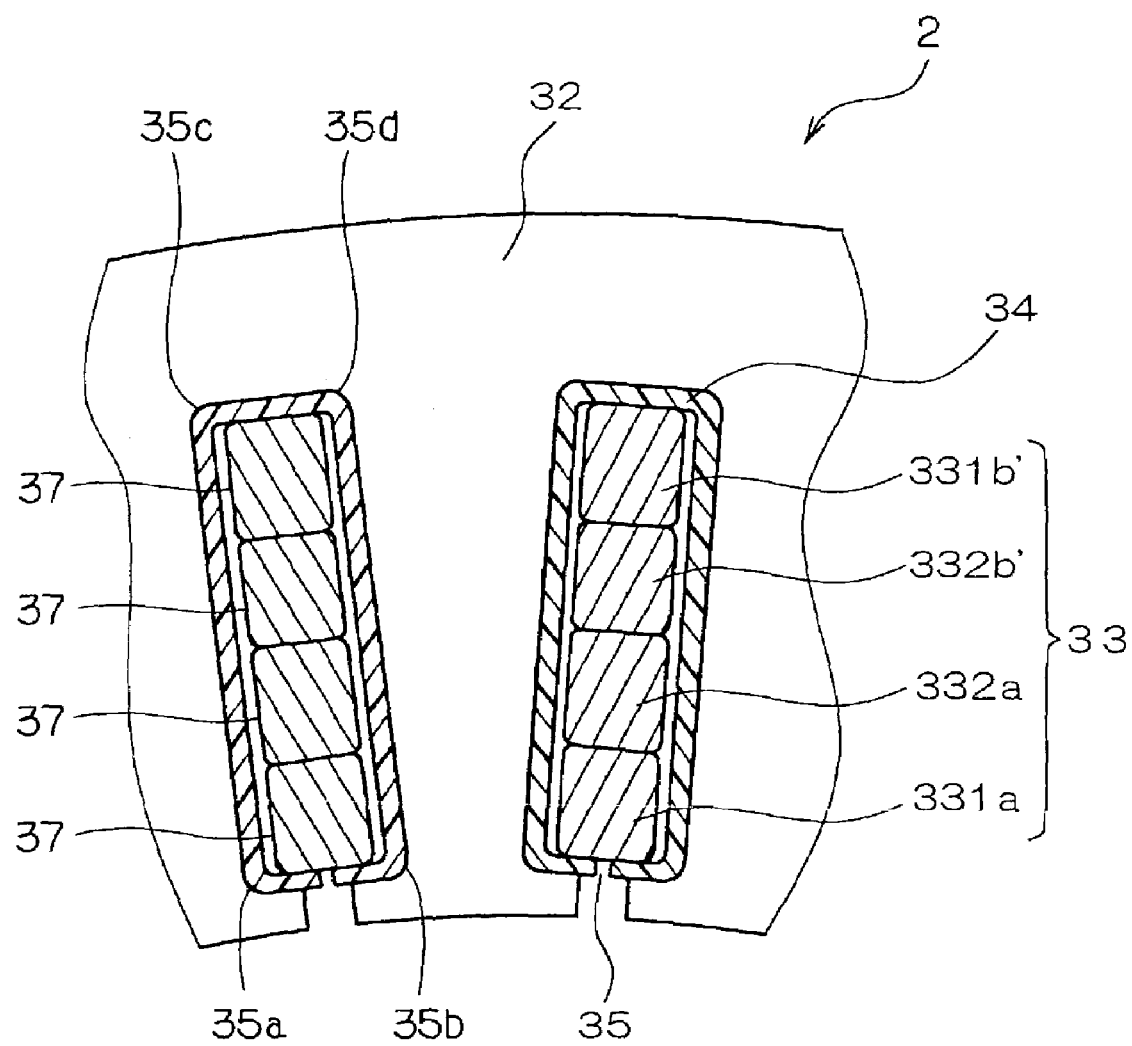
FIG. 2 is a cross-sectional view of a part of a stator according to the embodiment of the present invention.

As shown in FIG. 2, the stator core 32 has the plurality of slots 35 with openings on the inner diameter side for holding the multi-phase stator winding 31. In this embodiment, thirty-six slots 35, corresponding to the number of the poles of the rotor 3, are arranged at regular intervals for holding the three-phase stator winding 31.

The stator winding 31, which is held in the slots 35 of the stator core 32, can be grasped as a group of electric conductors, and even numbered electric conductors (four in this embodiment) are held in each slot 35. The four electric conductors are arranged in line in the slot 35 in order of inner end layer, inner middle layer, outer middle layer, and outer end layer from the inner diameter side in the radial direction of the stator core 32. The electric conductors are coated with insulating films 37 such as a polyamide-imide resin film.

The electric conductors are connected in predetermined patterns, thereby constructing the stator winding 31. In this embodiment, the electric conductors are connected through continuous turn portions placed on a side of the first coil end 31a and through end portions, which are opposite to the continuous turn portions, joined on a side of the second coil end 31b.

One of the electric conductors in each slot 35 pairs up with another electric conductor in another slot 35 that is a predetermined pole-pitch away. Specially, an electric conductor in a specific layer in the slot 35 pairs up with an electric conductor in another layer in another slot 35 that is a predetermined pole-pitch away, in order to maintain gaps between the plurality of electric conductors at the coil ends and line them.

For example, an electric conductor 331a in the inner end layer in one slot pairs up with the electric conductor 331b in the outer end layer in another slot 35 that is one pole-pitch away in the clockwise direction of the stator core 32. Likewise, an electric conductor 332a in the inner middle layer in one slot 35 pairs up with another electric conductor 332b in the outer middle layer in another slot 35 that is one pole-pitch away in the clockwise direction of the stator core 32.

The paired electric conductors are connected through turn portions 331c, 332c at one of the axial ends of the stator core 32. Therefore, the continuous turn portion that connects the electric conductor in the outer middle layer and the electric conductor in the inner middle layer is surrounded by the continuous turn portion that connects the electric conductor in the outer end layer and the electric conductor in the inner end layer, at one of the axial ends of the stator core 32.

In this way, the continuous portion of the paired electric conductors is surrounded by the continuous portion of another paired electric conductors held in the same slot, at the axial end of the stator core 32. By connecting the electric conductor in the outer middle layer and the electric conductor in the inner middle layer, a middle layer coil end is formed. By connecting the electric conductor in the outer end layer and the electric conductor in the inner end layer, an outer layer coil end is formed.

On the other hand, the electric conductor 332a in the inner middle layer in the slot 35 also pairs up with an electric conductor 331a' in the inner end layer in another slot 35 that is one pole-pitch away in the clockwise direction of the stator core 32. Likewise, an electric conductor 331b' in the outer end layer in the slot 35 pairs up with the electric conductor 332b in the outer middle layer in another slot 35 that is one pole-pitch away in the clockwise direction of the stator core 32. These electric conductors are connected together at the opposite axial end of the stator core 32 by welding.

Therefore, at the opposite axial end of the stator core 32, joint portions 331e', 332e connecting the electric conductor in the outer end layer and the electric conductor in the outer middle layer and joint portions 331d', 332d connecting the electric conductor in the inner end layer and the electric conductor in the inner middle layer are arranged in the radial direction of the stator core 32.

Adjacent layer coil ends are formed by connecting the electric conductors in the outer end layer and the electric conductors in the outer middle layer, and by connecting the electric conductors in the inner end layer and the electric conductors in the inner middle layer. In this way, at the opposite axial end of the stator core 32, the connecting portions of the paired electric conductors are arranged without overlapping.

Figure 3:
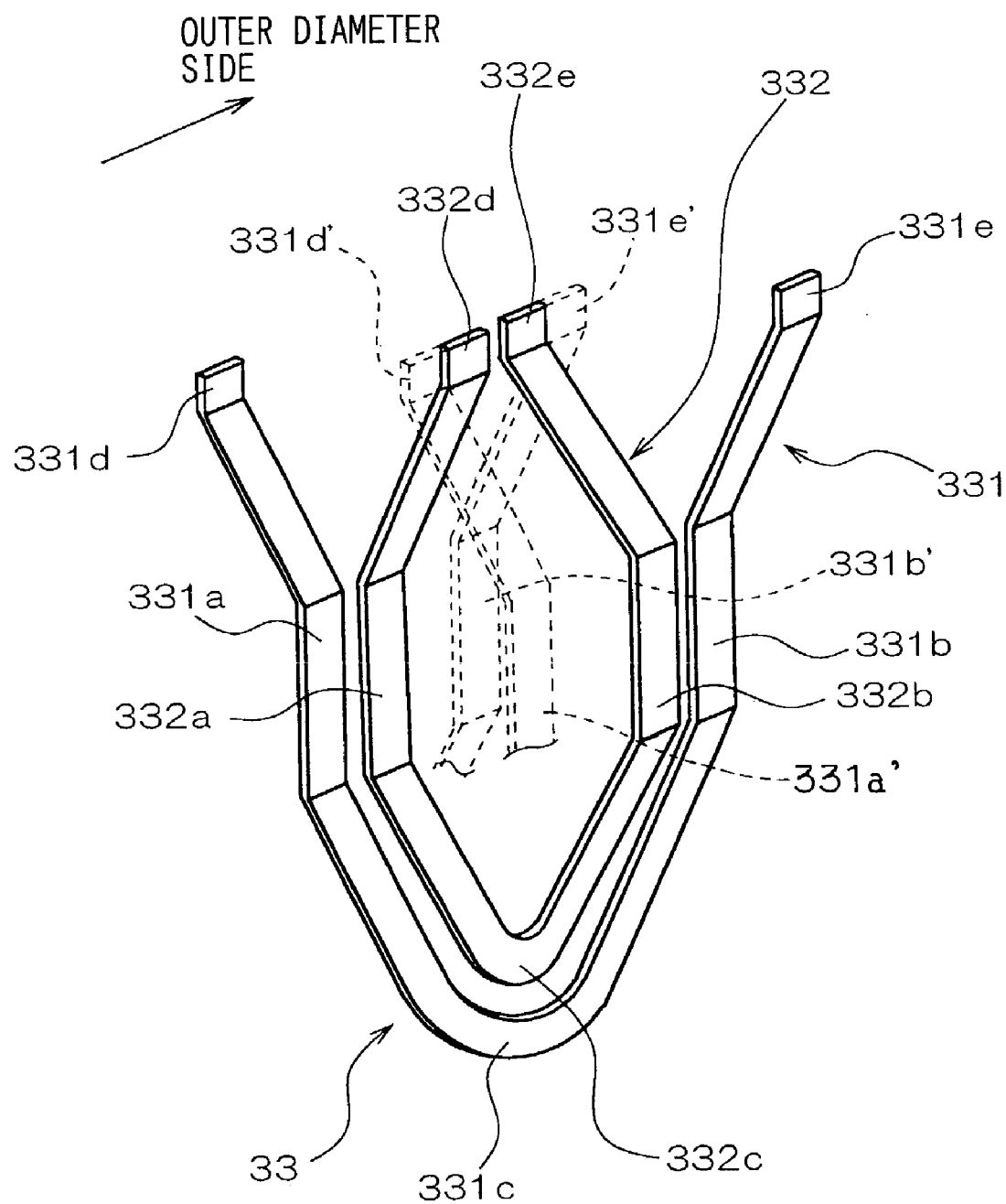
FIG. 3 is a perspective view of a base conductor segment to be mounted in a stator core according to the embodiment of the present invention.

Furthermore, the electric conductors are provided of U-shaped conductor segments that are produced by forming electric wires, which has substantially rectangular cross-sections and constant thickness, into predetermined shapes. As shown in FIG. 3, the electric conductors in the inner end layer and the outer end layer are provided of a large segment 331. The large segment 331 is formed of an electric wire shaped into substantially a U-shape. The electric conductors in the inner middle layer and the outer middle layer are provided of a small segment 332. The small segment 332 is formed of an electric wire shaped into substantially a U-shape.

The large segment 331 and the small segment 332 are included in the base conductor segment 33. The base conductor segments 33 are arranged regularly in the slots 35 so that a coil that turns twice around the stator core 32 is constructed. However, the conductor segments that include lead-out wires of the stator winding and turn portions connecting the first and the second laps are constructed of special shape conductor segments, which are in different shape from the base conductor segments 33. In this embodiment, three special shape conductor segments are provided. The connection between the first and the second laps is made between the electric conductors in the outer layer and the inner layer. Thus, special shape coil ends are formed.

A process of manufacturing the stator winding 31 will be described hereinafter.

[Inserting Step]

Figure 4:
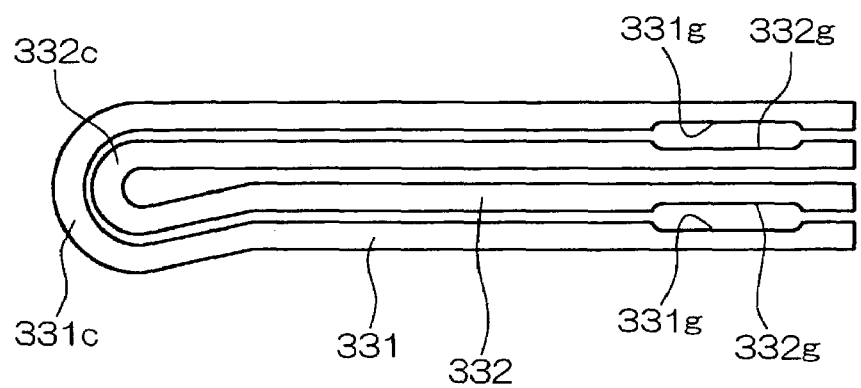
FIG. 4 is a schematic illustration of the base conductor segment before inserted in a slot of the stator core according to the embodiment of the present invention.

Each base conductor segment 33 is set such that the turn portion 332c of the U-shaped small segment 332 is surrounded by the turn portion 331c of the U-shaped large segment 331, as shown in FIG. 4. Then, the base conductor segment 33 is twisted into a predetermined shape and is inserted into the slots from one axial end of the stator core 32 in the axial direction. Specifically, the electric conductor 331a, which is one of the electric conductors of the large segment 331, is inserted in the inner end layer in the slot 35 of the stator core 32. The electric conductor 332a, which is one of the electric conductors of the small segment 332, is inserted in the inner middle layer 32 of the same slot 35. The other electric conductor 331b of the large segment 331 is inserted in the outer end layer of another slot 35 that is one-pole pitch away in the clockwise of the stator core 32. The other electric conductor 332b of the small segment 332 is inserted in the outer middle layer in that another slot 35.

Straight portions 331a, 332a, 332b' and 331b', which correspond to the above-described electric conductors, are arranged in line in the slot 35 in the order from the inner end layer in the radial direction, as shown in FIG. 2. Here, the straight portions 332b', 331b' are the straight portions of the small segment 332 and the large segment 331, and are paired up with another straight portions in another slots that are one-pole pitch away, respectively.

Here, as shown in FIG. 4, pressed portions (dents) 331g, 332g are formed in the large segment 331 and the small segment 332 adjacent to the ends opposite to the turn portions. The pressed portions 331g, 332g are formed by pressing portions of the large segment 331 and the small segment 332 in a predetermined direction (pressing direction) so that the dimensions at the pressed portion 331g, 332g are decreased in the pressing direction. The pressed portions 331g, 332g are to define gaps between opposing surfaces of the adjacent small segment 332 and large segment 331 in the stator winding 31. The pressed portions 331g, 332g are formed in a pressing step before the inserting step. The pressing step will be described later in detail.

[Bending Step]

After the inserting step, at the second coil end 31b, the straight portions 331a, 331b in the end layers are bent such that joint portions (ends) 331d, 331e are tilted for half-pole pitch (one and half slot in this embodiment) in a direction that the large segment 331 opens. Also, the straight portions 332a, 332b in the middle layers are bent such that the joint portions (ends) 332d, 332e are tilted for half-pole pitch in the direction that the small segment 332 closes. As a result, in the second coil end 31b, the electric conductors adjacent in the radial direction are tilted in opposite directions along the circumference of the stator core 32. The above bending steps are repeated for all conductor segments 33 in the slots 35.

[Joining Step]

Figure 5:
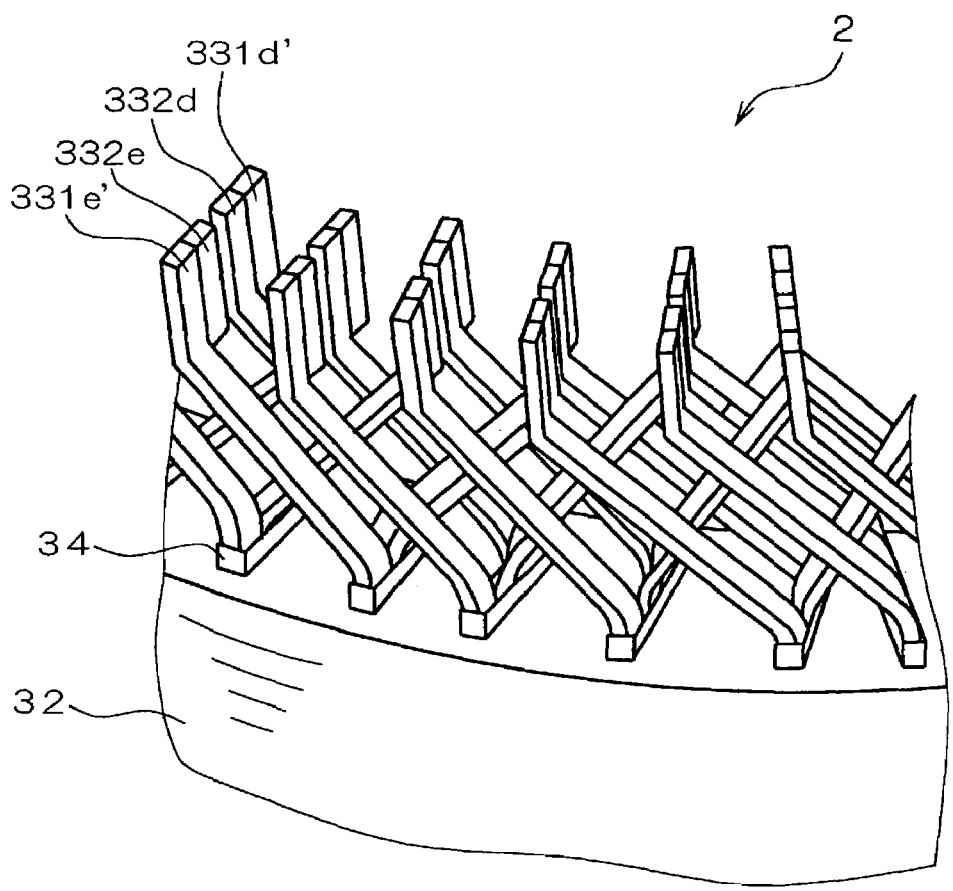
FIG. 5 is a perspective view of a part of the stator according to the embodiment of the present invention.

After the bending step, at the second coil end 31b, the joint portion 331e' in the outer end layer and the joint portion 332e in the outer middle layer are joined by welding, such as ultrasonic welding, arc welding and brazing, and by other method, to have electrical continuity. The joint portion 332d in the inner middle layer and the joint portion 331d' in the inner end layer are joined in the similar manner. In this way, the second coil end 31b shown in FIG. 5 is produced.

[Pressing Step]

Figure 6A:
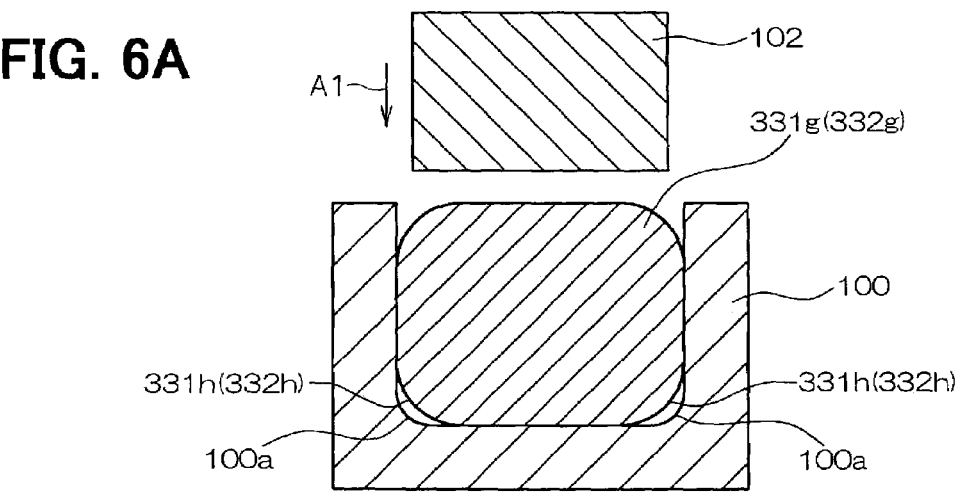
FIGS. 6A and 6B are schematic cross-sectional views of a die assembly used in a pressing step according to the embodiment of the present invention.
Figure 6B:
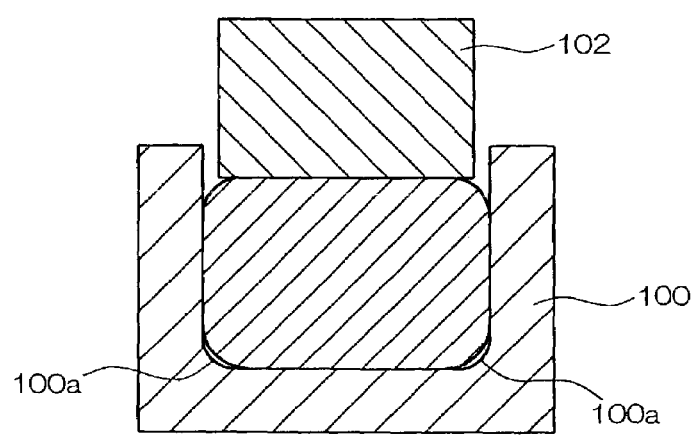

The pressing step is performed before the above-mentioned inserting step. As shown in FIG. 6A, the large segment 331 is placed such that a portion 331g to be pressed is held in a die 100. Then, the portion 331g is pressed by a punch 102 in one direction denoted by an arrow A1 in FIG. 6A. Here, the direction is referred to as the pressing direction. Therefore, the dimension of the pressed portion 331g in the pressing direction A1 is reduced, thereby forming the dent.

The die 100 has substantially a U-shaped cross-section and includes curved (arc-shaped) corner portions 100a to restrict deformation of corners 331h of the pressed portion 331g, which are inside of the die 100. When the portion 331g is pressed, the material itself of the portion 331g moves in the pressing direction A1. At this time, the corners 331h of the portion 331g inside the die 100 moves in the pressing direction A1. The movement of the corners 331h are restricted by the curved corner portions 100a and formed in the shape of the curved corner portions 100a. Similarly, the pressed portions 332g are formed in the small segments 332.

Figure 7:
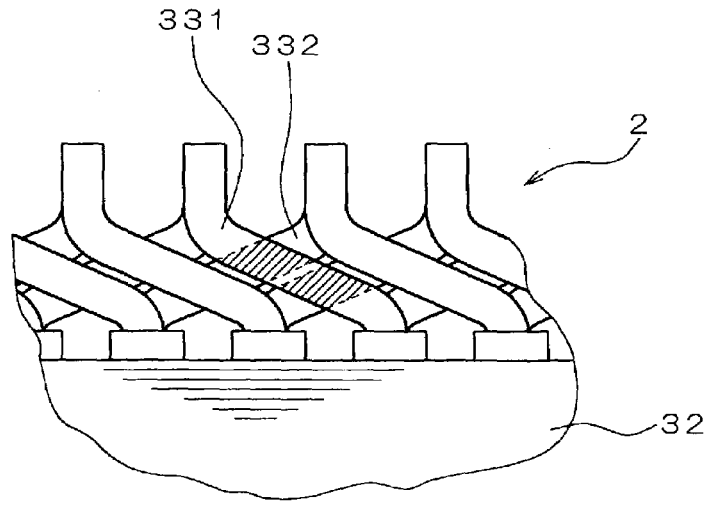
FIG. 7 is a schematic side view of the part of the stator according to the embodiment of the present invention.

By using the large segments 331 and the small segments 332 having the pressed portions 331g, 332g, gaps are defined at portions where the large segments 331 and the small segments 332 are crosses at the second coil end 31b, as denoted in hatched portions in FIG. 7.

As a result, it is less likely that the electric conductors adjacent in the radial direction of the stator core 32 will contact each other in the second coil end 31b due to vibrations of the vehicle. Because breakage of the insulating films 37, which are applied on the surfaces of the electric conductors, due to that contact is decreased, short circuits between the electric conductors are decreased.

In general, the slots 35 are formed by press working and the like, so the wall defining the slots 35 has curved corners 35a to 35d as shown in FIG. 2. Before the conductor segments 33 are inserted in the slots 35, the pressed portions 331g, 332g are formed in the pressing step and the corners 331h, 332h of the pressed portions 331g, 332g are formed in the shape of the curved corner portions 100a of the die 100.

Therefore, it is less likely that the insulators 34 will be damaged or broken at the corners 35a to 35d by the corners 331h, 332h when the conductor segments 33 are inserted in the slots 35. Accordingly, electrical insulations between the conductor segments 33 and the stator core 32 are maintained. The pressing step is performed at least to the electric conductors arranged in the inner end layer and the outer end layer.

Preferably, a radius of the corner portion 100a of the die 100 corresponds to a radius of the corner 35a to 35d of the slots 35. With this, pressure from the conductor segment 33 is uniformly applied to the insulator 34, thereby suppressing damages to the insulator 34. Further, the radius of the corner portion 100a of the die 100 is determined in consideration of a thickness of the insulator 34. Therefore, the pressure applied to the insulator 34 is further uniformed, thereby preventing damage to the insulator 34. Accordingly, electrical insulations between the stator ore 32 and the conductor segments 33 are ensured.

Allowing for size variations of the slots 35 and the conductor segments 33 caused during the manufacture, gaps can be defined between the insulator 34 and the wall of the slot 35 and between the conductor segments 33 and the insulator 34 on both the sides of the conductor segments 33 in the circumferential direction of the stator core 32. For example, the total of the gap on each side is 80 μm, so it can restricts the pressed portion 331g, 332g to interfere with the insulator 34 and the slot 35 when the conductor segments 33 are inserted. Therefore, it makes easy to insert the conductor segments 33 in the slots 35 in which the insulator 34 is provided.

The insulating films 37 at the joint portions 331d, 331e, 332d, 332e of the electric conductors are peeled off before the pressing step. Since the electric conductors have substantially rectangular-shaped cross-sections, it is easy to peel off the insulating films 37 on the joining surfaces.

Figure 8A:
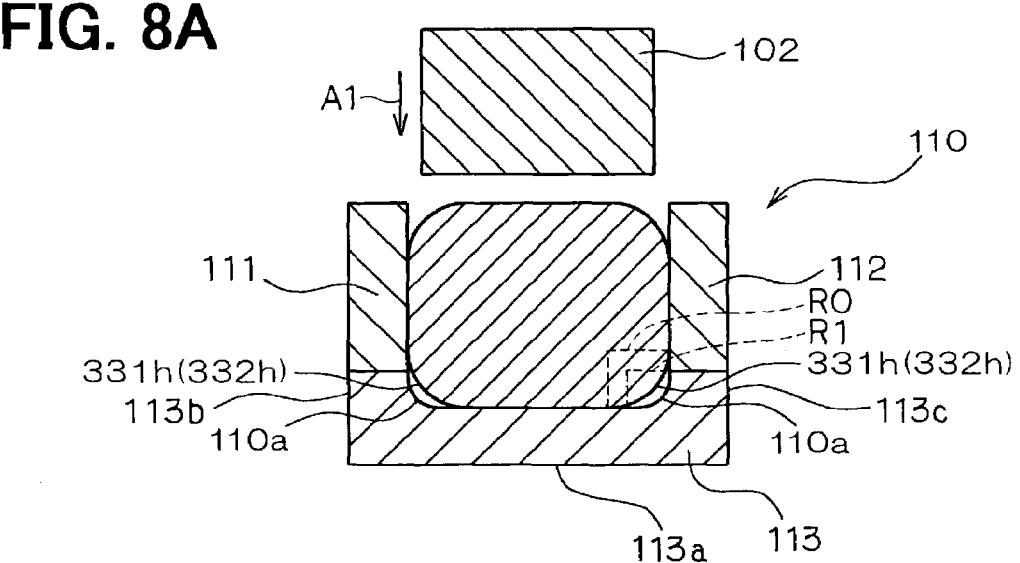
FIG. 8A to 8C are schematic cross-sectional views of a die assembly used in a pressing step of a modified embodiment of the present invention.
Figure 8B:
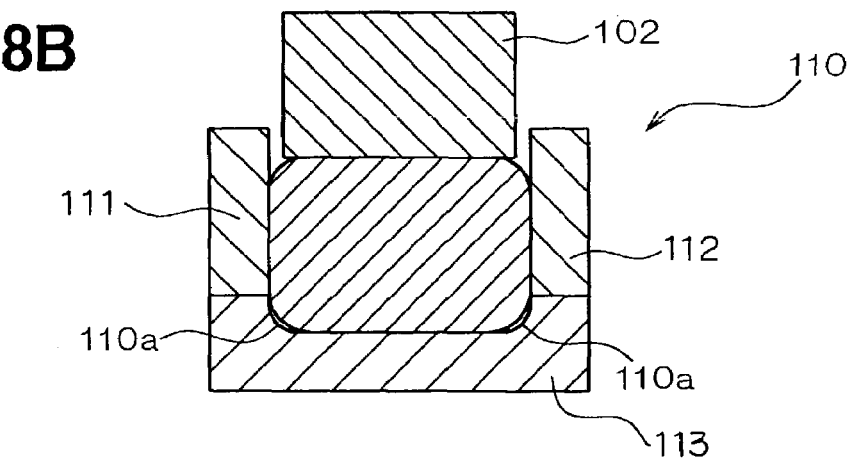
Figure 8C:
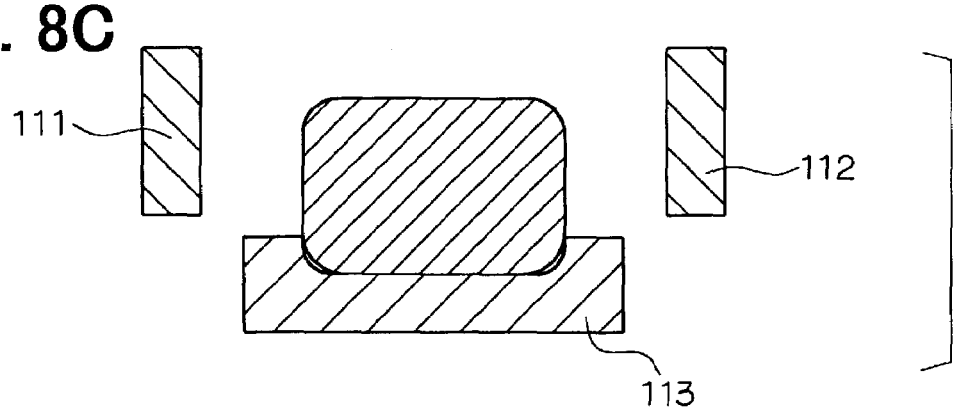

The above described embodiment is modified in other ways. For example, the die can be formed of three separate walls. As shown in FIGS. 8A to 8C, a die 110 has a base wall 113 and side walls 111, 112 that are perpendicular to the base wall 113 to define the space in which the electric conductor 331, 332 is held. The side walls 111, 112 are detachable from the base wall 113.

The base wall 113 includes a plate-like base portion 113a and protruding portions 113b, 113c protruding substantially perpendicular to the flat portion 113a. The base portion 113a forms curved corner portions 110a with the protruding portions 113b, 113c. Each corner portion 110a has a radius R1 that is greater than a radius R0 of the corners 331h, 332h of the electric conductors before the pressed portions 331g, 332g are formed.

The electric conductor is placed in the space surrounded by the side walls 111, 112 and the base wall 113, as shown in FIG. 8A. Then, it is pressed with the punch 102 so that the dent (pressed portion 331g, 332g) is formed on the electric conductor, as shown in FIG. 8B (dent forming step). Further, the corners 331h, 332h of the electric conductor is formed in the shape of the curved corner portions. 110a.

After the electric conductors are dented, a fixing state of the side walls 111, 112 are released and the side walls 111, 112 are removed from the base wall 113 in a direction perpendicular to the pressing direction A1 (removing step), as shown in FIG. 8C. Then, the electric conductor is separated from the base wall 113 (separating step). Thereafter, the electric conductors are inserted in the slots 35 in the manner same as the above.

When the electric conductor is pressed by the punch 102 while its sides are restricted with the die 100, if the corner portions 110a are not formed within the die 110, the corners of the electric conductors are deformed or crushed. The volumes (cross-sectional areas) of the pressed portion 331g, 332g increase while the radius R0 decreasing. Therefore, the insulating film 37 around the corner is broken due to the deformation. On the contrary, since the corner portions 110a having the radius R1 are formed in the die 110, the deformation of the corner 331h, 332h is restricted.

Because a space between the surface of the corner portion 110a and the surface of the corner 331h, 332h of the electric conductor is small, the electric conductor may be caught on the inner surfaces of the side walls 111, 112, and the base wall 113. Since the side walls 111, 112 can be removed from the base wall 113 in the direction that the material itself of the electric conductor, which is in contact with the side walls 111, 112, moves during the pressing. Therefore, the side walls 111, 112 are easily removed form the electric conductor.

When the electric conductor is separated from the base wall 113, the electric conductor is moved in the direction that the surface of the electric conductor, which is in contact with the base wall 113, moves during the pressing. Therefore, the electric conductor is easily separated from the base wall 113.

Since the wire (electric conductor), which has substantially the rectangular-shaped cross-section including corner with the radius R0, is used, the insulating film 37 at the joint portions are easily peeled off, thereby easing manufacturability. Even in the electric conductor having such the small radius R0 at corners, since the corners 331h, 332h of the electric conductor are in press-contact with the corner portions 110a of the die 110, which has the radius R1 smaller than that R0 of the electric conductor, deformation over the radius R1 is restricted. Therefore, breakage of the insulating film 37 due to the excess deformation is suppressed, thereby maintaining the electrical insulation between the stator core 32 and the electric conductor.

Further, since the irregular deformation of the electric conductor is restricted, the electric conductor is easily inserted in the slot 35. In addition, even if the electric conductor is caught on the inner surfaces of the die 110 by the pressure, since the side walls 111, 112 can be removed from the base wall 113, the electric conductor is easily separated from the die 110.

After the dent is formed on the electric conductor, the base wall 113 can be removed from the side walls 111, 112 first. Then, the electric conductor can be separated from the side walls 111, 112. Also, the side walls 111, 112 can have the protruding portions protruding in the direction perpendicular to the pressing direction A1, and the corner portions 110a can be formed within the side walls 111, 112.

The pressed portions 332g can be eliminated from the small segments 332. That is, the pressed portions 331g can be formed only to the large segment 331. The corner portions 100a, 110a can have any other shapes as long as the shape can restrict excess deformation of the conductor segments 33. For example, the corner portions 100a, 110a can be sloped at 45 degrees with respect to the bottom surface of the die 100 by chamfering or have polygonal shapes.

Further, in place of the U-shaped conductor segments 33, straight conductor segments can be used. The both ends of the straight conductor segments are joined at both axial ends of the stator core 32.

Figure 9A:
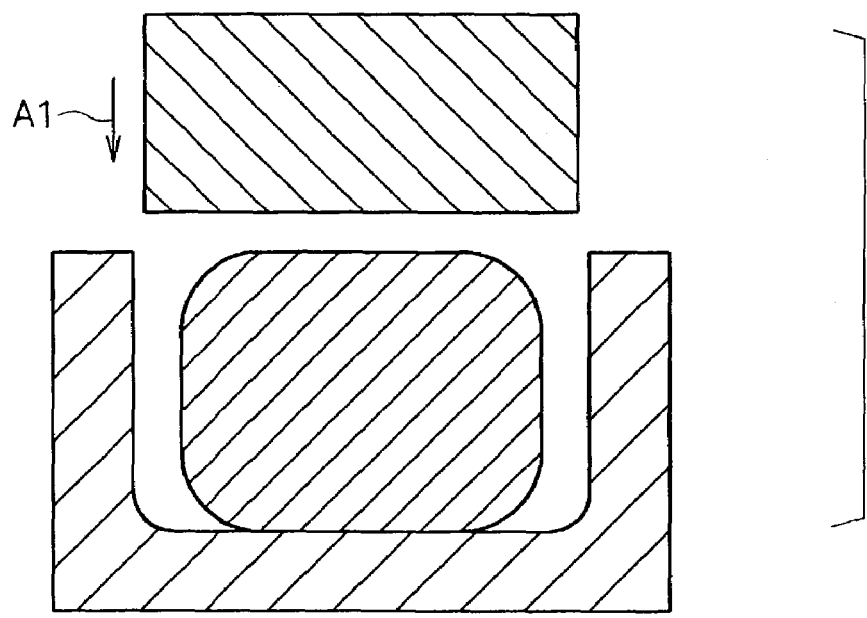
FIGS. 9A and 9B are schematic cross-sectional views of a die assembly used in a pressing step of another modified embodiment of the present invention.
Figure 9B:
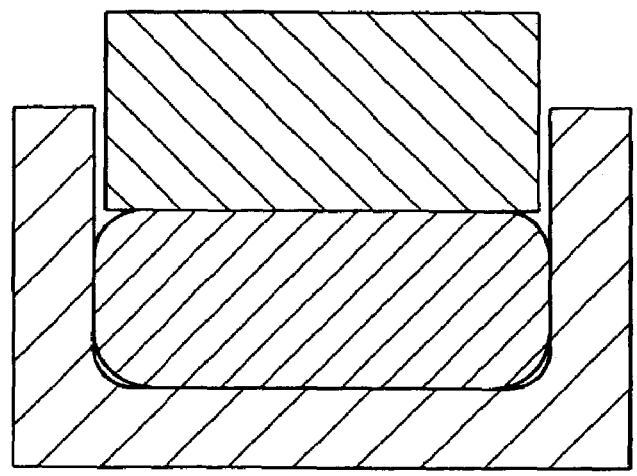

In the pressing step, the sides of the electric conductor is restricted with the side walls of the die, so the width of the pressed portion 331g, 332g does not generally change before and after pressing. However, it may be possible to increase the width while restricting deformation of the corner portions 331h, 332h, as shown in FIGS. 9A and 9B.

Figure 10:
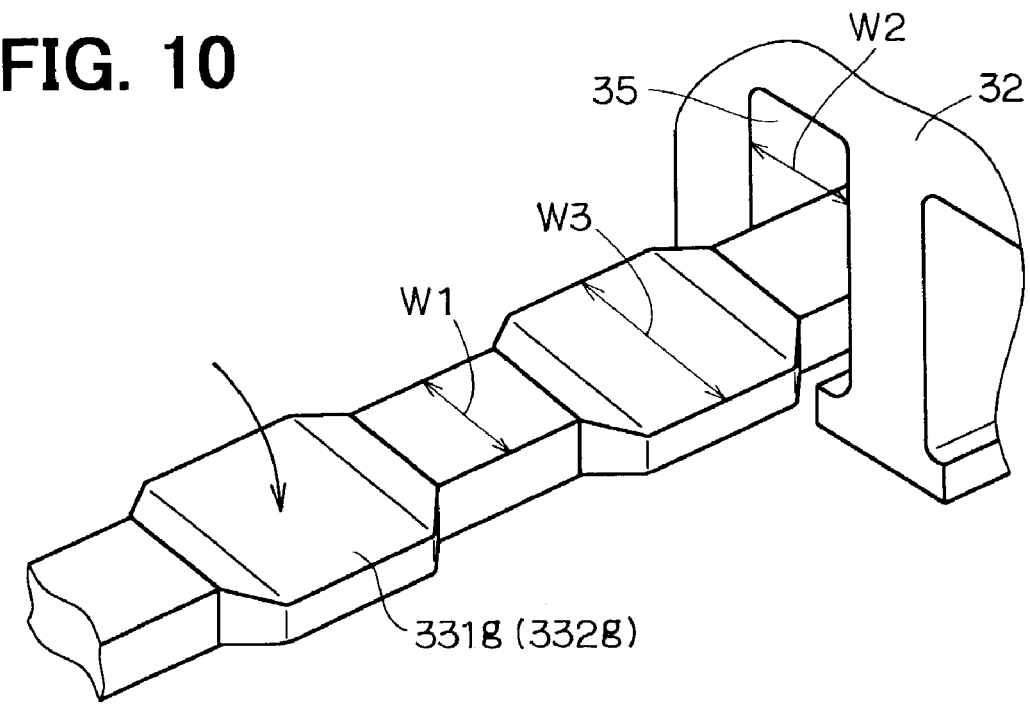
FIG. 10 is a perspective view of a part of a stator of another modified embodiment of the present invention.

As shown in FIG. 10, in a case that a width W1 of the electric conductor before the pressing is substantially the same as a width W2 of the slot in the circumferential direction to increase an occupancy of the stator winding in the slots 35, a width W3 of the pressed portion 331g, 332g may increase more than the width W2 (except for the thickness of the insulator) by pressing. In this case, it is preferable to insert the electric conductor such that the pressed direction A1 is in consistent with the circumferential direction of the stator core 32 (that is, in the condition that the electric conductor is turned 90 degrees from the position shown in FIG. 10.) After inserted, it is turned 90 degrees to the position shown in FIG. 10.

Therefore, even in the case that the width W3 of the pressed portion 331g, 332g is increased more than the width W2 of the slot during the pressing step, the electric conductor can be arranged in the slot by turning after the insertion, thereby capable of forming the stator winding 31.

Figure 11:
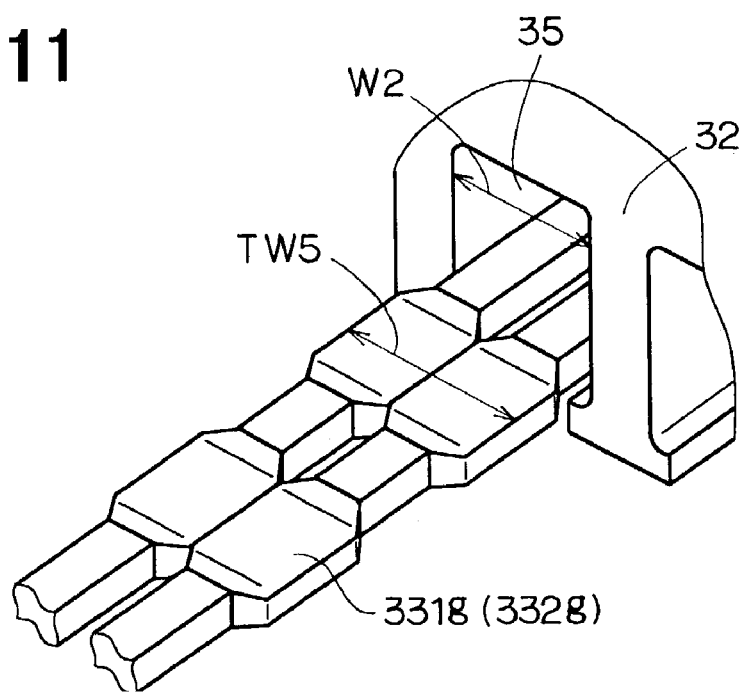
FIG. 11 is a perspective view of a part of a stator of another modified embodiment of the present invention.
Figure 12A:
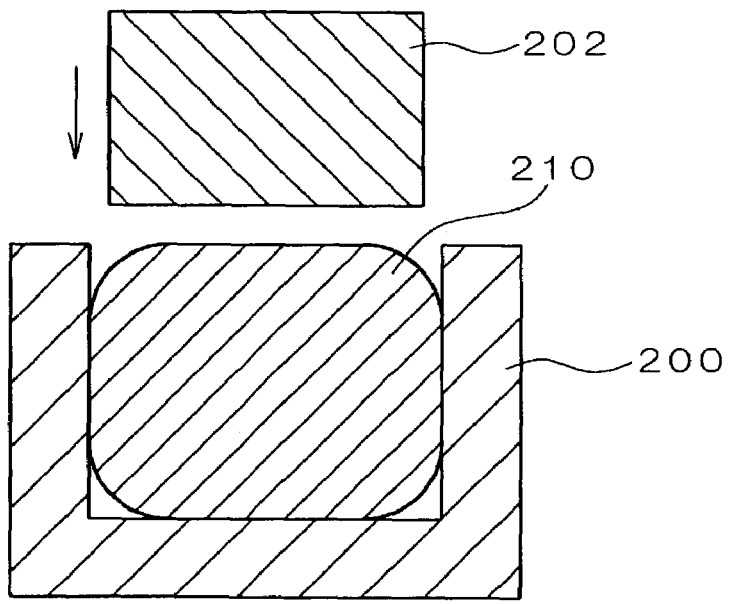
FIGS. 12A and 12B are schematic cross-sectional view of a die assembly of a related art.
Figure 12B:
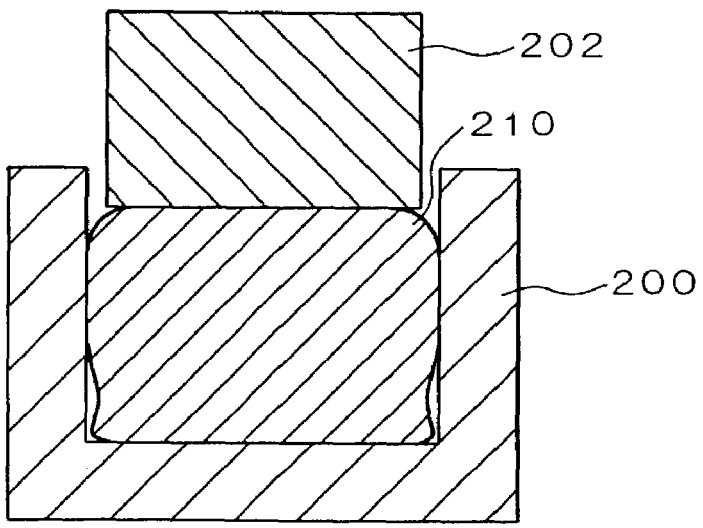

FIG. 11 shows a case that plural electric conductors are provided in the slot 35 and those are arranged in line along the circumferential direction of the stator core 32. The total width TW5 of the electric conductors in the circumferential direction is greater than the width W2 of the slot 35 except for the thickness of the insulator 34. In that case, it is preferable that the total width of the pressed portions of some electric conductors and of non-pressed portions of other electric conductors is smaller than the width W2 of the slot 35 except for the thickness of the insulator 34. In this case, the electric conductors are inserted in the slot 35 separately. Therefore, even in the case that the plural electric conductors are arranged in the circumferential direction in the slot 35, the electric conductors, the width of which are increased during pressing, can be easily inserted in the slot, thereby capable of forming the stator winding 31.

The present invention can be applied to manufacture a stator winding of rotary electric machines other than the vehicular alternator or windings other than the stator winding.

The present invention should not be limited to the disclosed embodiments, but may be implemented in other ways without departing from the spirit of the invention.

What is claimed is:

1. A method of manufacturing a winding for a rotary electric machine, comprising:
    preparing a plurality of electric conductors, each of which has a substantially rectangular cross-section that has corners with a predetermined radius curvature, and surfaces of which are coated with an insulating film;
    preparing a die in a predetermined shape having curved corner portions formed with a predetermined radius curvature that is smaller than the radius curvature of the electric conductor;
    placing a portion of the electric conductor in the die;
    pressing the portion of the electric conductor with a punch in a direction perpendicular to a longitudinal direction of the electric conductor to reduce a dimension of the substantially rectangular cross-section of the electric conductor, and to form a dent in the electric conductor and the corners of the electric conductor in the shape of the corner portions of the die; and
    connecting the electric conductors to form winding in a manner that the adjacent electric conductors cross each other in the portions where the dents are formed.

2. The method according to claim 1, further comprising:
    joining the electric conductors at ends,
    wherein the insulating films at the ends of the electric conductors are peeled before joined, and the electric conductors construct a conductor segment.

3. The method according to claim 1, wherein the die includes a base wall and side walls that are substantially perpendicular to the base wall to define substantially a U-shaped space therein.

4. The method according to claim 3, wherein the side walls are detachable from the base wall.

5. The method according to claim 3, wherein the corner portions of the die is formed on the base wall.

* * * * *